United States Patent
Maeda et al.

(10) Patent No.: US 11,052,446 B2
(45) Date of Patent: Jul. 6, 2021

(54) METHOD FOR JOINING MEMBERS, AND JOINT BODY

(71) Applicant: Kobe Steel, Ltd., Hyogo (JP)

(72) Inventors: Yasuhiro Maeda, Kobe (JP); Toru Hashimura, Kobe (JP); Kenichi Watanabe, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 288 days.

(21) Appl. No.: 16/327,683

(22) PCT Filed: Sep. 1, 2017

(86) PCT No.: PCT/JP2017/031622
§ 371 (c)(1),
(2) Date: Feb. 22, 2019

(87) PCT Pub. No.: WO2018/061618
PCT Pub. Date: Apr. 5, 2018

(65) Prior Publication Data
US 2019/0210087 A1 Jul. 11, 2019

(30) Foreign Application Priority Data

Sep. 28, 2016 (JP) .............................. JP2016-190069

(51) Int. Cl.
*B21D 39/04* (2006.01)
*B21D 39/20* (2006.01)
(Continued)

(52) U.S. Cl.
CPC .............. *B21D 39/04* (2013.01); *B21D 39/06* (2013.01); *B21D 39/20* (2013.01); *B21D 53/88* (2013.01)

(58) Field of Classification Search
CPC ........ B21D 39/04; B21D 53/88; B21D 39/20; B21D 39/06; B21D 39/206; F16B 4/004; F16B 11/002
See application file for complete search history.

(56) References Cited

U.S. PATENT DOCUMENTS 3,432,916 A * 3/1969 Reichert ............... B21D 39/206
29/516
4,418,457 A * 12/1983 Mueller ................. B21D 39/06
29/237

(Continued)

FOREIGN PATENT DOCUMENTS

EP         3254781 A1 * 12/2017 ........... B21D 39/032
JP         2007-222877 A      9/2007
(Continued)

OTHER PUBLICATIONS

International Preliminary Report on Patentability issued in corresponding International Application No. PCT/JP2017/031622; dated Apr. 11, 2019.

(Continued)

*Primary Examiner* — Lee A Holly
(74) *Attorney, Agent, or Firm* — Studebaker & Brackett PC (57) ABSTRACT

A method for joining members includes: providing a wall surface body which is a die-molded article provided with a hole portion with a draft angle provided from its opposite end portions toward its center portion, a tubular body with a hollow shape, and an elastic body; inserting the tubular body into the hole portion in the wall surface body; inserting the elastic body into the inside of the tubular body; and compressing the elastic body in the direction of an axial line L of the tubular body to expand the elastic body outwardly in the radial direction of the axial line L, thereby deforming (Continued)

and expanding the tubular body to joint the tubular body to the wall surface body by press-fitting.

9 Claims, 12 Drawing Sheets

(51) Int. Cl.
  *B21D 39/06* (2006.01)
  *B21D 53/88* (2006.01)

(56) References Cited

U.S. PATENT DOCUMENTS

| | | | |
|---|---|---|---|
| 2010/0289300 A1* | 11/2010 | Kokubo | B62D 21/02 296/205 |
| 2015/0175217 A1* | 6/2015 | Morris | F16B 19/002 296/193.01 |
| 2018/0015527 A1 | 1/2018 | Maeda et al. | |

FOREIGN PATENT DOCUMENTS

| | | | | |
|---|---|---|---|---|
| JP | 2010-046709 A | | 3/2010 | |
| JP | 2016-147309 A | | 8/2016 | |
| JP | 2016147309 A | * | 8/2016 | ............ B21D 39/20 |

OTHER PUBLICATIONS

International Search Report issued in PCT/JP2017/031622; dated Nov. 28, 2017.

\* cited by examiner

METHOD FOR JOINING MEMBERS, AND JOINT BODY

CROSS-REFERENCE TO RELATED APPLICATIONS

This is a national phase application in the United States of International Patent Application No. PCT/JP2017/031622 with an international filing date of Sep. 1, 2017, which claims priority of Japanese Patent Application No. 2016-190069 filed on Sep. 28, 2016 the contents of which are incorporated herein by reference.

TECHNICAL FIELD

The present disclosure relates to a method for joining members, and a joint body.

BACKGROUND ART

For weight reduction and safety improvement for automobiles, there have been used metals with lower specific weights and higher strengths, which are called high-tension steels. High-tension steels are effective in weight reduction and safety improvement, but have larger weights than those of materials with lower specific weights, such as aluminum. Further, in cases where such high-tension steels are used, there are induced the problems of degradation in moldability, increases in molding loads, degradation in size accuracy and the like, since such high-tension steels have higher strengths. In order to overcome these problems, in recent years, there have been advanced multi-material techniques for utilizing steel components in combination with extruded-molded articles, casted articles and press-molded articles which are formed from aluminum with lower specific weights than those of steels.

For realizing such multi-material techniques, there is a problem of joining metals of different types, such as steel components and aluminum components, to each other. For example, JP 2016-147309 A discloses a member joining method which employs an elastic body for enabling joining between metals of different types for realizing multi-material techniques. According to the member joining method in JP 2016-147309 A, an aluminum pipe (second member) is inserted into a hole portion of a steel component (first member), then an elastic body is inserted into the inside of the aluminum pipe, and the elastic body is pressurized to expand the aluminum pipe, thereby joining the steel member and the aluminum pipe by press-fitting.

SUMMARY OF THE INVENTION

Problems to be Solved by the Invention

Regarding the member joining method disclosed in JP 2016-147309 A, there is no description about provision of a draft angle in the hole portion of the first member. For example, in cases where the first member is a die-molded article such as a die-casted article, a casted article, a forged article or a resin product, it is necessary that the hole portion in the first member is provided with the draft angle in view of detachability from the die. However, regarding the member joining method disclosed in JP 2016-147309 A, there is no particular description about a member joining method which is effective in such cases.

Embodiments of the present invention have been made in view of the aforementioned circumstances and aim at providing a method for joining members, the method utilizing an elastic body and being effective in cases where a die-molded article having a hole portion with a draft angle is to be jointed therethrough.

Means for Solving the Problems

A method for joining members according to an embodiment of the present invention includes: providing a first member which is a die-molded article provided with a hole portion with a draft angle provided from its opposite end portions toward its center portion, a second member with a hollow shape, and an elastic body; inserting the second member into the hole portion in the first member; inserting the elastic body into an inside of the second member; and compressing the elastic body in a direction of an axial line of the second member to expand the elastic body outwardly in a radial direction of the axial line, thereby expanding and deforming the second member to join the second member to the first member by press-fitting.

With this method, the second member is evenly deformed to be expanded by the elastic body, which can reduce local loads imposed on the second member, thereby preventing local deformation. This can improve the accuracy of fitting between the first member and the second member, thereby increasing the joining strength. Further, this method is simple in comparison with joining methods utilizing electromagnetic forming or other processing.

Further, since the first member is a die-molded article, it is necessary to provide a draft angle in the hole portion. With the aforementioned structure, the hole portion in the first member is provided with a draft angle from its opposite end portions toward its center portion, namely is provided with a draft angle in the different directions. By providing a draft angle in different directions as described above, it is possible to overcome two problems induced by provision of a draft angle only in a single direction. More specifically, if the hole portion of the first member is provided with a draft angle in a single direction such that the diameter is gradually decreased from one end portion toward the other end portion, there is larger joining strength against a pull-out load in the direction in which the diameter of the hole portion decreases, but there is smaller joining strength against a pull-out load in the direction in which the diameter of the hole portion increases. That is, depending on the direction of the pull-out load, there exists smaller joining strength in a direction (the first problem). Further, in this case, the one end portion of the hole portion has a larger inner diameter than the inner diameter of the other end portion. At the one end portion of the hole portion which has a relatively-larger inner diameter, the second member deforms to expand in a relatively larger amount, and the second member experiences a larger deformation burden (the second problem). For addressing these two problems, there is provided the draft angle in the different directions, in the aforementioned structure. This can eliminate the direction in which there is smaller joining strength, which is the first problem, thereby ensuring larger joining strength against pull-out loads in any directions. Further, the one end portion of the hole portion is increased in diameter by a smaller amount in comparison with cases of providing a draft angle only in a single direction, which can reduce the deformation burden imposed on the second member, which is the second problem.

A core may be further provided, the core may be inserted into the inside of the second member, and the elastic bodies may be inserted into the second member in opposite sides with the core sandwiched between the elastic bodies.

With this method, the second member can be suppressed from deforming at its portion where the core is placed therein, which can suppress unnecessary deformation of the second member at the other portion than the joint portions, thereby reducing deformation burdens imposed on the second member. Further, there is no need for the elastic bodies at the portion where the core is placed, which allows the elastic bodies to have a smaller volume, thereby reducing the overall amount of compression.

The first member may be provided in its inner surface with an uninclined surface having no draft angle, and the first member may be provided with an opening portion at a position facing the uninclined surface.

With this method, since the first member is provided with the opening portion, it is possible to reduce the weight of the first member. Further, by utilizing the opening portion as a die removing hole for use in molding, it is possible to provide the uninclined surface with higher surface accuracy in the inner surface of the first member. By utilizing the uninclined surface with such higher surface accuracy, it is possible to cause the first member and the second member to come in close contact with each other with higher accuracy to form a joint surface therebetween, which can suppress unstable rattling during joining them, thereby improving the joint strength.

The hole portion in the first member may have a trapezoid cross section, the uninclined surface may be provided in an upper bottom side of the hole portion, the opening portion may be provided in a lower bottom side of the hole portion, and the upper bottom side of the hole portion may be provided with a draft angle larger than a draft angle provided in the lower bottom side.

With this method, since the draft angle in the upper bottom side is larger than the draft angle in the lower bottom side, when the second member deforms to expand, the second member comes into contact with the first member at its lower bottom side at first and, thereafter, the second member is pressed against the uninclined surface of the upper bottom side. That is, when the second member is pressed against the uninclined surface in the upper bottom side, the second member is supported by the first member at its lower bottom side, and thus the second member is deformed to expand into a state of being in close contact with the uninclined surface in the upper bottom side with substantially no gap therebetween. Since the uninclined surface in the upper bottom side is formed with higher surface accuracy as described above, the first member and the second member are allowed to come in close contact with each other with higher accuracy to form a joint surface therebetween, which can suppress unstable rattling during joining, thereby further improving the joint strength.

The second member may have a diameter increased in a trumpet shape at its one end portion.

With this method, if a pull-out load is imposed on the second member, the second member having such a trumpet shape is latched at its end portion to play a role in preventing the pull-out thereof, thereby improving the joint strength.

An outer frame die may be further provided, the outer frame die may be placed on an outer side of the first member, and the first member and the second member may be jointed to each other by press-fitting in a state where the first member is suppressed from deforming by the outer frame die.

With this method, the first member is suppressed from deforming due to the use of the outer frame die. This can prevent plastic deformation of the first member.

A joint body according to an embodiment of the present invention includes: a first member which is a die-molded article provided with a hole portion with a draft angle provided from its opposite end portions toward its center portion; and a second member with a hollow shape which is inserted into the hole portion of the first member, wherein the second member is jointed to the first member by press-fitting in a state where the second member is expanded.

With this structure, since the hole portion in the first member is provided with the draft angle from its opposite end portions toward the center portion, it is possible to ensure higher joint strength against pull-out loads in any directions, as described above.

According to the present invention, there is provided the method for joining members which utilizes the elastic body, wherein the first member which is a die-molded article is to be jointed therethrough, and the hole portion of the first member is provided with the draft angle from its opposite end portions toward the center portion, thereby enabling joining the first member and the second member to each other with higher joining strength and with lower deformation burdens.

MODE FOR CARRYING OUT THE INVENTION

Hereinafter, embodiments of the present invention will be described with reference to the drawings.

First Embodiment

With reference to FIGS. 1A to 2D, there will be described a method for joining members for joining a wall surface body (first member) 10 and a tubular body (second member) 20 to each other by press-fitting.

Figure 1A:
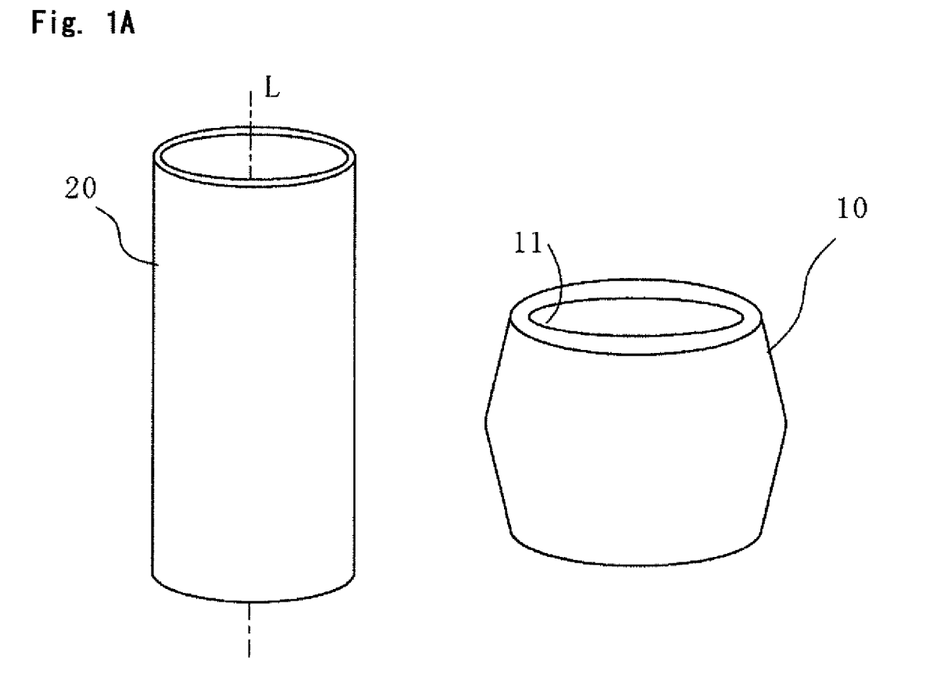
FIG. 1A is a perspective view of a wall surface body and a tubular body to be subjected to a method for joining members according to a first embodiment, before they are jointed to each other.

As illustrated in FIG. 1A, the wall surface body 10 is a circular pipe with a hole portion 11 with a circular cross section. The wall surface body 10 is a die-molded article fabricated through die casting and is formed from an aluminum alloy, a magnesium alloy, a zinc alloy, or a copper alloy, for example. Since the wall surface body 10 is a die-casted article, the wall surface body 10 is provided with a draft angle in its hole portion 11. The draft angle is provided from the opposite end portions 12 and 13 toward the center portion 14, namely in different directions, rather than being provided in a single direction from one end portion 12 toward the other end portion 13 (see FIG. 2A). More specifically, the draft angle is provided such that the hole diameter decreases gradually from the opposite end portions 12 and 13 of the hole portion 11 toward the center portion 14 (see FIG. 2A). Similarly, the wall surface body 10 is provided with a draft angle in its outer surface, such that the outer diameter increases gradually from the opposite end portions 12 and 13 toward the center portion 14 (see FIG. 2A). The magnitudes of the draft angles are about 2 to 5 degrees, for example.

As illustrated in FIG. 1A, the tubular body 20 according to the present embodiment is a hollow circular pipe extending in the direction of an axial line L. The outer diameter of the tubular body 20 is smaller than the inner diameter of the hole portion 11 in the wall surface body 10, namely the tubular body 20 has a size which can be inserted in the hole portion 11 of the wall surface body 10. The tubular body 20 is an extruded member formed from an aluminum alloy, for example.

Figure 1B:
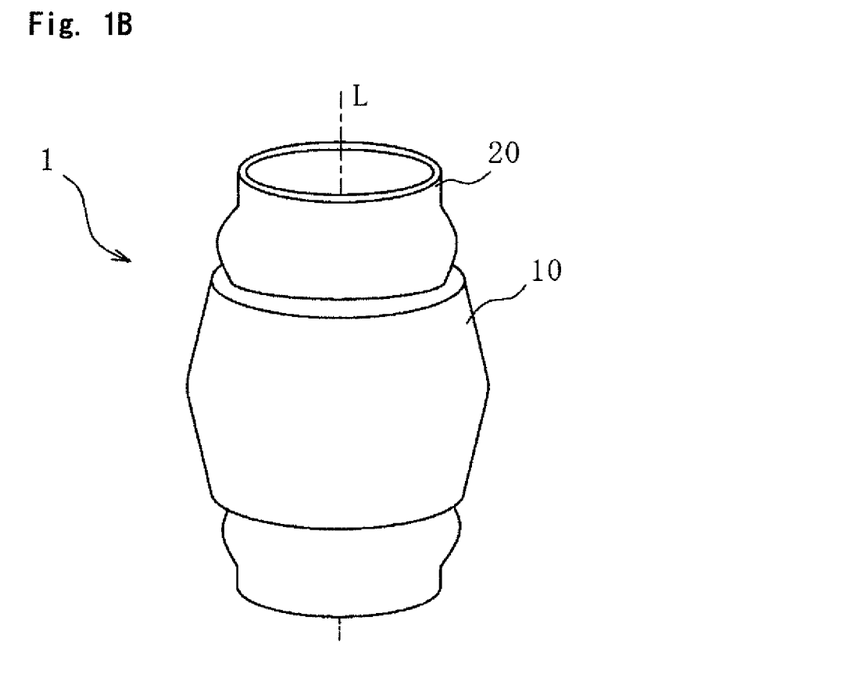
FIG. 1B is a perspective view of the wall surface body and the tubular body after they are jointed to each other according to the method for joining members according to the first embodiment.

As illustrated in FIG. 1B, by utilizing the method for joining members according to the present embodiment, the tubular body 20 expands outwardly in the radial direction of the axial line L, and the tubular body 20 is jointed to the hole portion 11 in the wall surface body 10 by press-fitting, thereby forming a joint body 1. When viewed in the direction of the axial line L, the hole portion 11 in the wall surface body 10 preferably has an inner shape similar to the outer shape of the tubular body 20 and, further, preferably has a smallest possible size which enables inserting the tubular body 20 therein.

The materials of the wall surface body 10 and the tubular body 20 are not limited to those described above. More specifically, the wall surface body 10 may be any die-molded article required to have a draft angle and may be also a casted article, a forged article or a resin product, for example, as well as the aforementioned die-casted article. Further, the tubular body 20 is required only to have a hollow shape and plastic deformability. The tubular body 20 may be also a pressed member formed from a high-tension steel, for example, and can be formed from arbitrary materials, as well as the aforementioned extruded member formed from an aluminum alloy. The same applies to second to sixth embodiments which will be described later.

As illustrated in FIGS. 2A to 2F, the method for joining members according to the present embodiment will be described by being divided into first to sixth processes.

Figure 2A:
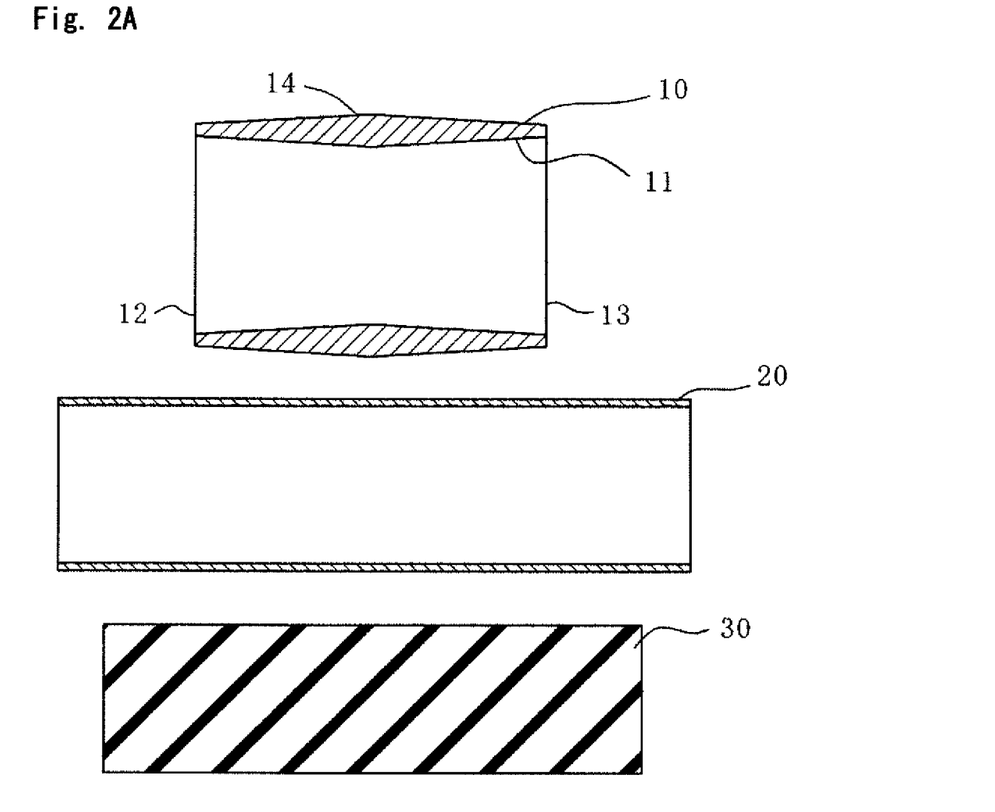
FIG. 2A is a cross-sectional view of a first process in the method for joining members according to the first embodiment.

As illustrated in FIG. 2A, in the first process, the wall surface body 10, the tubular body 20, and an elastic body 30 are provided. The elastic body 30 is constituted by a rubber with a circular cylindrical shape with an outer diameter which can be inserted in the tubular body 20. The elastic body 30 is required to have a length enough to deform the tubular body 20 around the joint portion. The material of the elastic body 30 is, for example, a urethane rubber, a chloroprene rubber, a CNR rubber (chloroprene rubber+nitrile rubber), a silicone rubber, or the like.

Figure 2B:
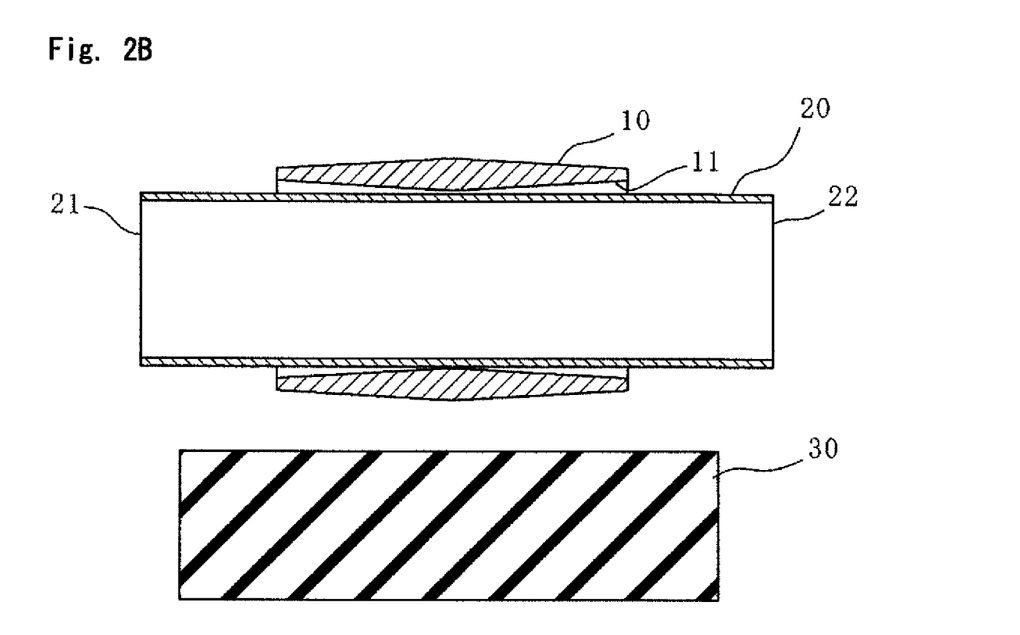
FIG. 2B is a cross-sectional view of a second process in the method for joining members according to the first embodiment.

As illustrated in FIG. 2B, in the second process, the tubular body 20 is inserted into the hole portion 11 in the wall surface body 10. The tubular body 20 is inserted through the wall surface body 10, and the tubular body 20 is exposed out of the wall surface body 10 at its opposite end portions 21 and 22.

Figure 2C:
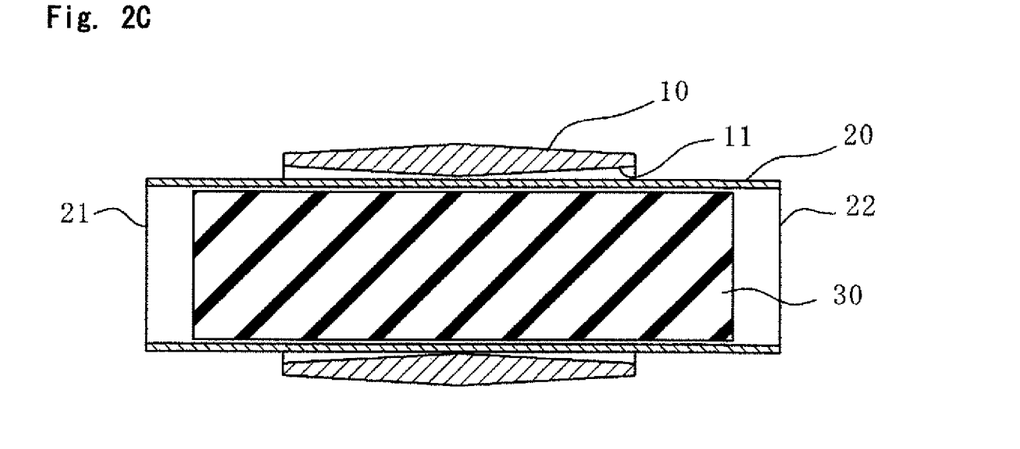
FIG. 2C is a cross-sectional view of a third process in the method for joining members according to the first embodiment.

As illustrated in FIG. 2C, in the third process, the elastic body 30 is inserted into the inside of the tubular body 20. Instead thereof, the tubular body 20 may be also inserted into the hole portion 11 in the wall surface body 10, in the state where the elastic body 30 is inserted into the inside of the tubular body 20. Namely, the second process and the third process may be interchanged in the order.

Figure 2D:
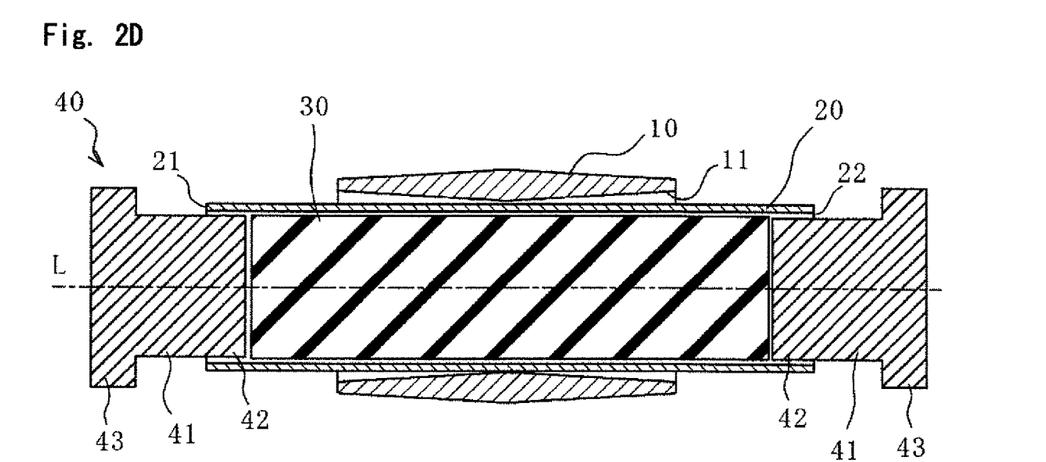
FIG. 2D is a cross-sectional view of a fourth process in the method for joining members according to the first embodiment.

As illustrated in FIG. 2D, in the fourth process, the wall surface body 10, the tubular body 20, and the elastic body 30 are set into a pressurizing apparatus 40, in the state of being combined with each other. The pressurizing apparatus 40 according to the present embodiment is a press apparatus and includes two pressurizers 41. Instead thereof, the pressurizing apparatus 40 may be constituted by a hydraulic cylinder and the like. The two pressurizers 41 include a projection portion 42 with a circular cylindrical shape, and a flange portion 43 provided around the projection portion 42. The projection portions 42 of the pressurizers 41 have a circular cylindrical shape with an outer diameter which can be inserted in the tubular body 20 and has substantially the same size as the outer diameter of the elastic body 30. The projection portions 42 have an end surface which is a flat surface perpendicular to the axial line L, in order to evenly press the elastic body 30. In the state where they have been set in the pressurizing apparatus 40, the projection portions 42 of the two pressurizers 41 have been inserted in the opposite end portions 21 and 22 of the tubular body 20. Between the two pressurizers 41 having been inserted therein, there is placed the elastic body 30.

Figure 2E:
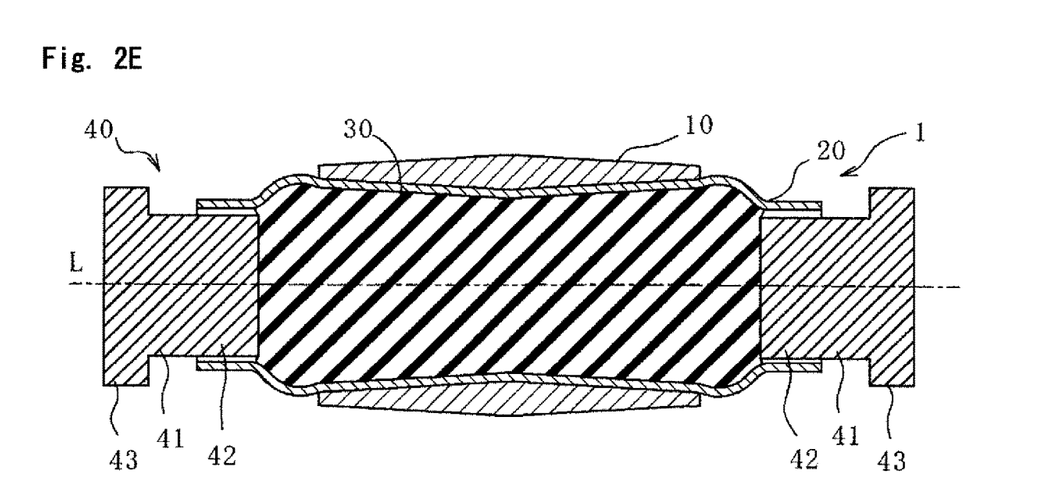
FIG. 2E is a cross-sectional view of a fifth process in the method for joining members according to the first embodiment.

As illustrated in FIG. 2E, in the fifth process, the elastic body 30 is compressed in the direction of the axial line L, with the pressurizing apparatus 40. As the elastic body 30 is decreased in size in the direction of the axial line L, the size thereof in the radial direction is increased. Accordingly, the tubular body 20 is subjected to forces from the elastic body 30 being increased in size in the radial direction, thereby being deformed to be expanded outwardly in the radial direction. The tubular body 20 having been deformed to be expanded is jointed to the wall surface body 10 by press-fitting, thereby forming a joint body 1.

Figure 2F:
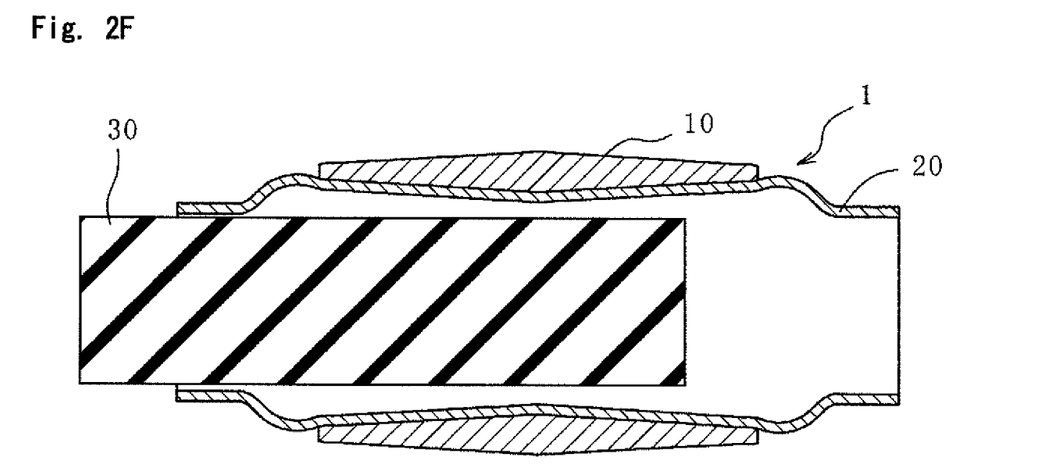
FIG. 2F is a cross-sectional view of a sixth process in the method for joining members according to the first embodiment.

As illustrated in FIG. 2F, in the sixth process, after joining, the joint body 1 and the elastic body 30 are disengaged from the pressurizing apparatus 40 (see FIG. 2E). The elastic body 30, from which the compressing force from the pressurizing apparatus 40 (see FIG. 2E) has been removed, is restored to its original shape due to its own elastic force. Accordingly, the elastic body 30 can be easily removed from the joint body 1.

With the method for joining members according to the present embodiment which has been described with respect to the aforementioned first to sixth processes, the tubular body 20 can be evenly deformed to be expanded by the elastic body 30, which can reduce local loads imposed on the tubular body 20, thereby preventing local deformation. This can improve the accuracy of fitting between the wall surface body 10 and the tubular body 20, thereby increasing the joining strength. Further, this method is simple in comparison with joining methods utilizing electromagnetic forming or other processing.

Figure 3A:
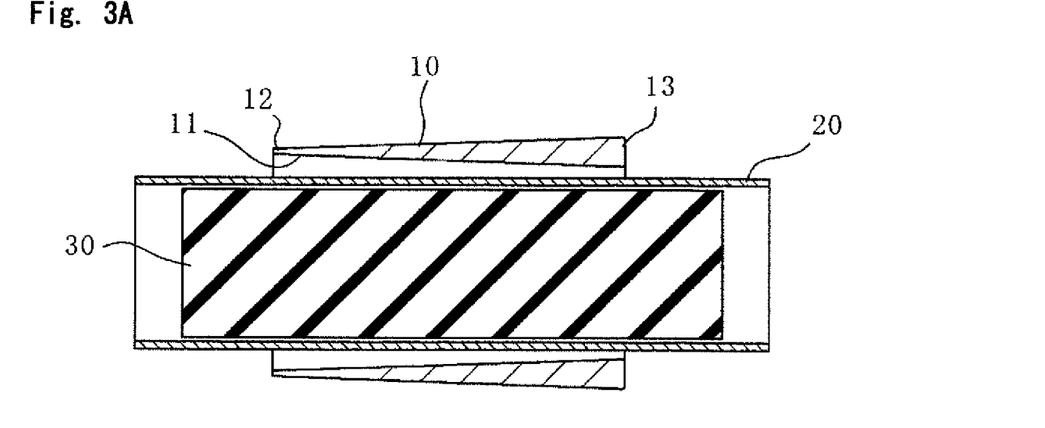
FIG. 3A is a cross-sectional view of a comparison example before joining, regarding the method for joining members according to the first embodiment.
Figure 3B:
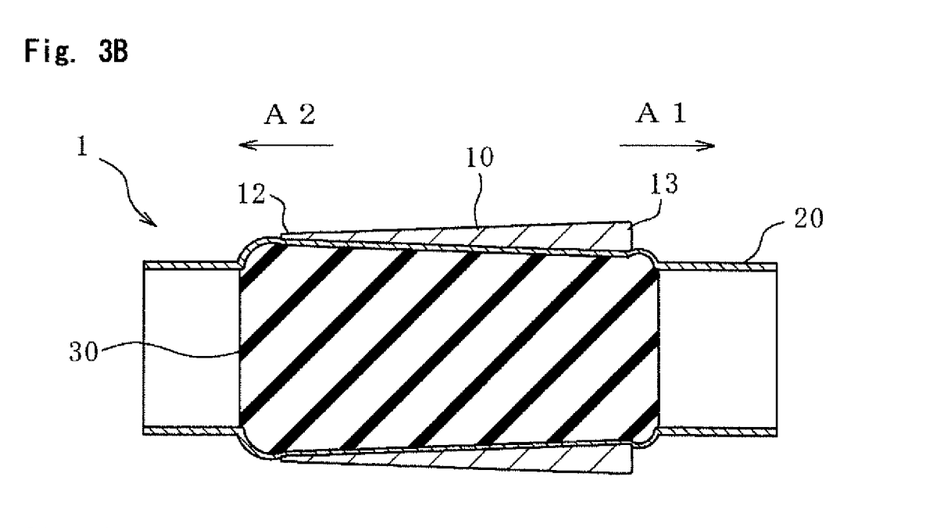
FIG. 3B is a cross-sectional view of the comparison example after joining, regarding the method for joining members according to the first embodiment.

Further, since the wall surface body 10 is a die-molded article, it is necessary to provide a draft angle in the hole portion 11. In the present embodiment, the hole portion 11 in the wall surface body 10 is provided with a draft angle from its opposite end portions 12 and 13 toward its center portion 14, namely is provided with a draft angle in different directions. By providing a draft angle in different directions as described above, it is possible to overcome two problems induced by provision of a draft angle only in a single direction. More specifically, as illustrated in FIGS. 3A and 3B, if the hole portion 11 of the wall surface body 10 is provided with a draft angle in a single direction such that the diameter is gradually decreased from one end portion 12 toward the other end portion 13, there is larger joining strength against a pull-out load in the direction in which the diameter of the hole portion 11 decreases (in the direction of an arrow A1), but there is smaller joining strength against a pull-out load in the direction in which the diameter of the hole portion 11 increases (in the direction of an arrow A2). That is, depending on the direction of the pull-out load, there exists smaller joining strength in a direction (the first problem). Further, in this case, the one end portion 12 of the hole portion 11 has a larger inner diameter than the inner diameter of the other end portion 13. At the one end portion 12 of the hole portion 11 which has a relatively-larger inner diameter, the tubular body 20 deforms to expand in a relatively larger amount, and the tubular body 20 experiences a larger deformation burden (the second problem). For addressing these two problems, there is provided a draft angle in different directions, in the structure according to the present embodiment. This can eliminate the direction in which there is smaller joining strength, which is the first problem, thereby ensuring larger joining strength against pull-out loads in any directions. Further, the one end portion 12 of the hole portion is increased in diameter by a smaller amount in comparison with cases of providing a draft angle only in a single direction, which can reduce the deformation burden imposed on the tubular body 20, which is the second problem.

Second Embodiment

Figure 4A:
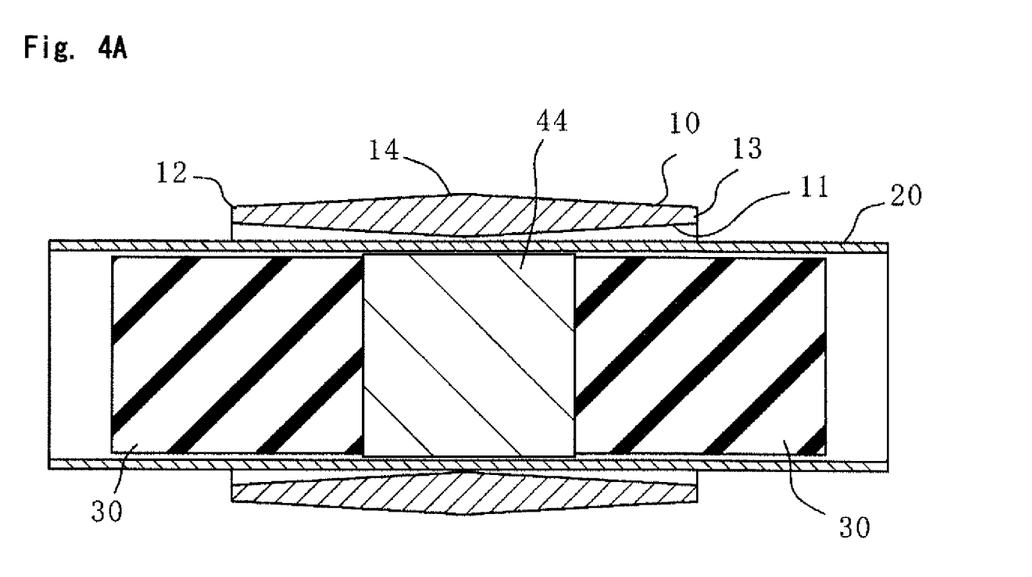
FIG. 4A is a cross-sectional view of a method for joining members according to a second embodiment, before joining.
Figure 4B:
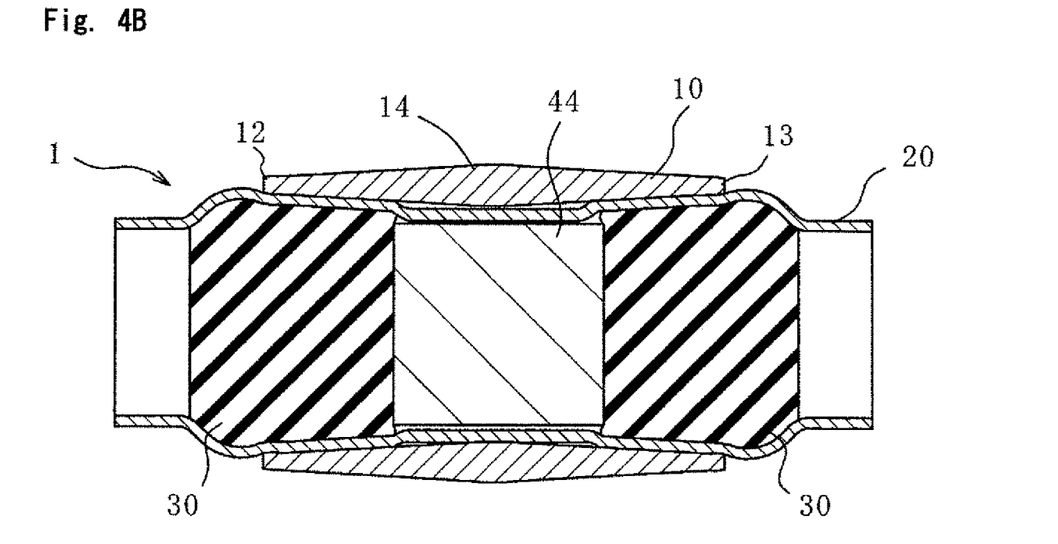
FIG. 4B is a cross-sectional view of the method for joining members according to the second embodiment, after joining.

FIGS. 4A and 4B illustrate a method for joining members according to a second embodiment. In the present embodiment, the same constituent elements as those in the first embodiment will be designated by the same reference characters and will not be described redundantly.

In the present embodiment, a core 44 is used unlike in the first embodiment. The core 44 is a steel component with a circular cylindrical shape, for example. The shape and the material of the core 44 are arbitrary, provided that the core 44 is not deformed by the compressing force from the pressurizing apparatus 40.

As illustrated in FIG. 4A, in the present embodiment, in a process corresponding to the third process in the first embodiment, the core 44 is inserted into the inside of the tubular body 20, similarly to elastic bodies 30. When the elastic bodies 30 are inserted into the tubular body 20, they are inserted thereinto in the opposite sides with the core 44 sandwiched therebetween. That is, in the present embodiment, the two elastic bodies 30 are used. The core 44 is placed in the center portion 14 inside the tubular body 20, and the two elastic bodies 30 are placed at joint portions inside the tubular body 20.

As illustrated in FIG. 4B, in a process corresponding to the fifth process in the first embodiment, the two elastic bodies 30 are pressed at the opposite sides by a pressurizing apparatus which is not illustrated, in order to joint the wall surface body 10 and the tubular body 20 by press-fitting.

With the method for joining members according to the present embodiment, the tubular body 20 is suppressed from deforming at its portion where the core 44 is placed therein, which can suppress unnecessary deformation of the tubular body 20 at the other portion than the joint portions, thereby reducing deformation burdens imposed on the tubular body 20. Further, there is no need for the elastic bodies 30 at the portion where the core 44 is placed, which allows the elastic bodies 30 to have a smaller volume, thereby reducing the overall amount of compression.

Third Embodiment

FIGS. 5A to 6B illustrate a method for joining members according to a third embodiment. In the present embodiment, the same constituent elements as those in the first embodiment will be designated by the same reference characters and will not be described redundantly.

Figure 5A:
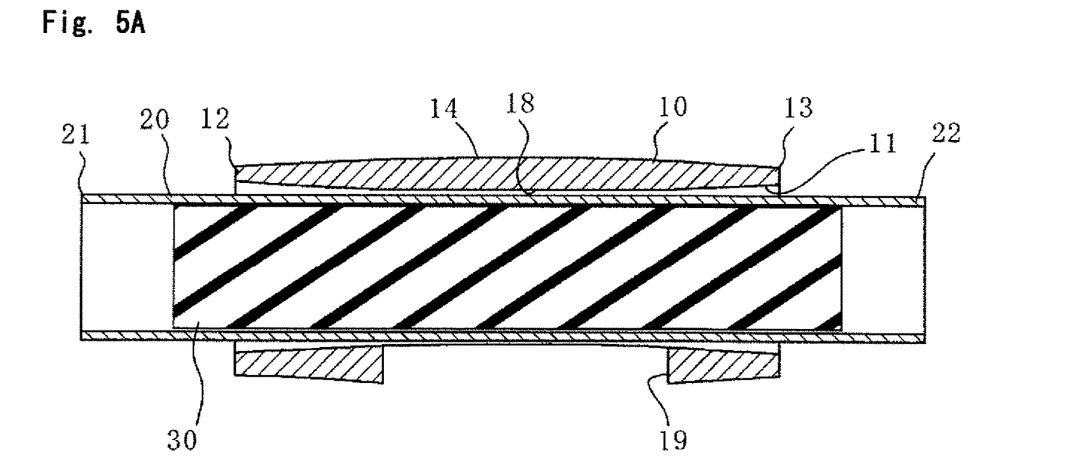
FIG. 5A is a cross-sectional view of a method for joining members according to a third embodiment, before joining.
Figure 5B:
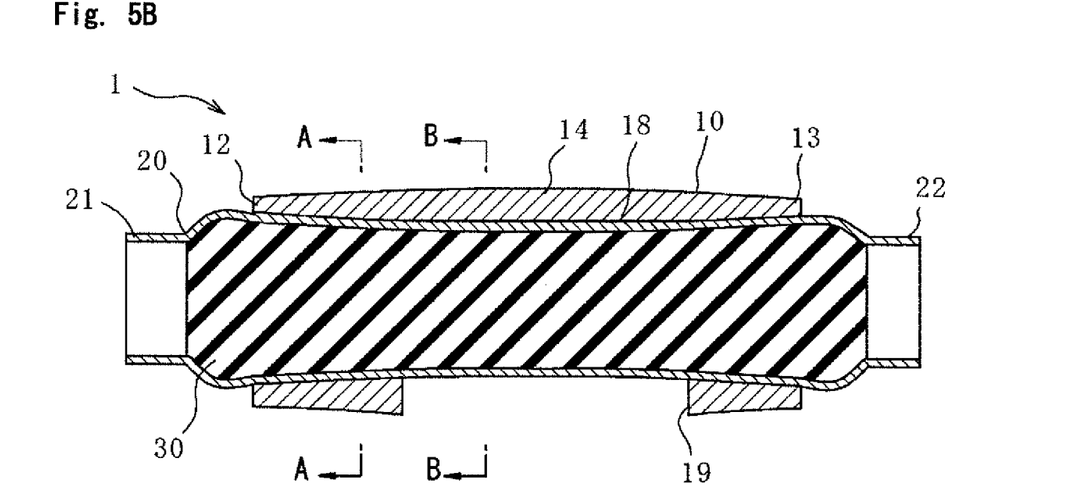
FIG. 5B is a cross-sectional view of the method for joining members according to the third embodiment, after joining.
Figure 6A:
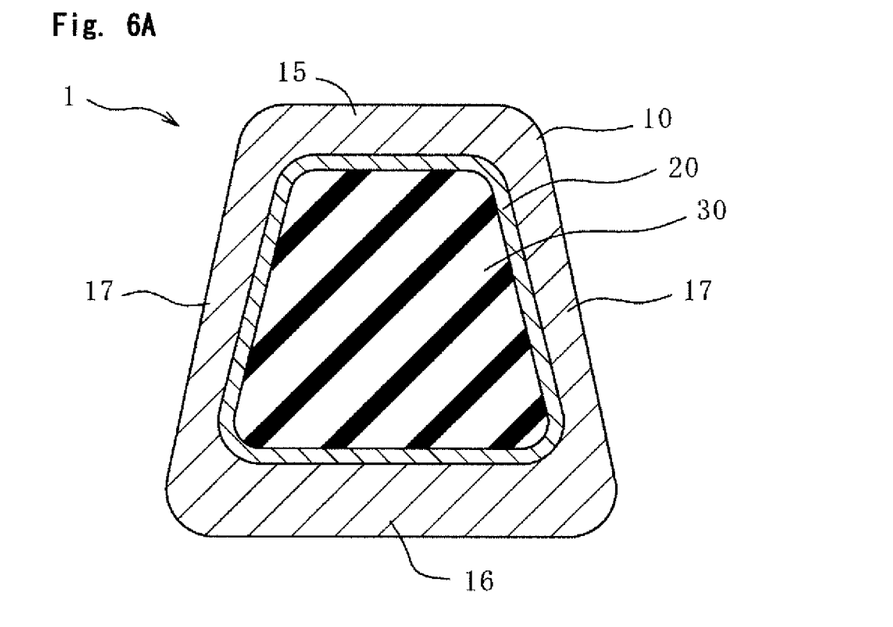
FIG. 6A is a cross-sectional view of a method for joining members according to a fourth embodiment, before joining.
Figure 6B:
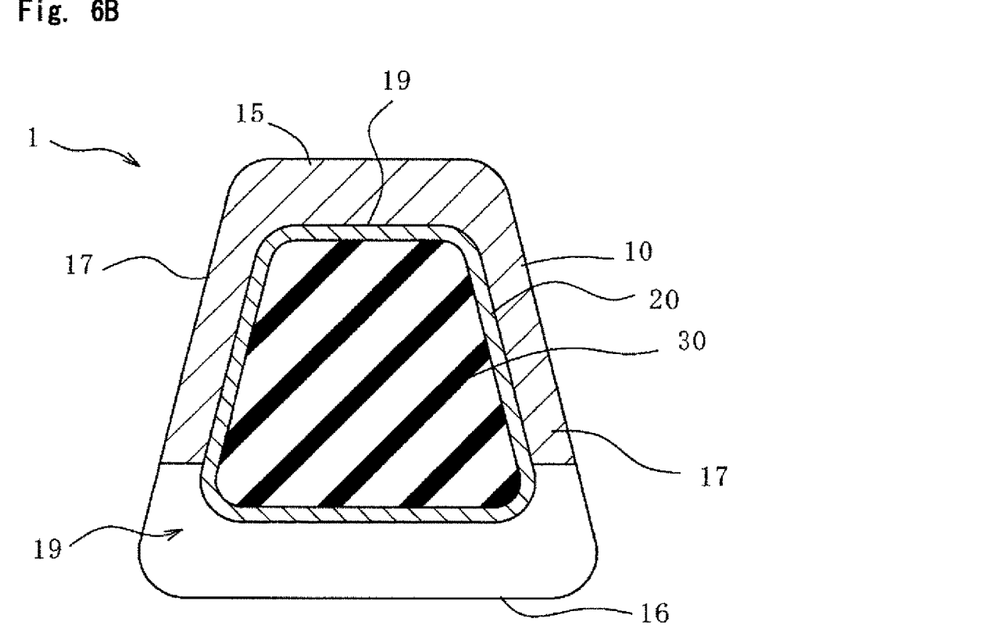
FIG. 6B is a cross-sectional view of the method for joining members according to the fourth embodiment, after joining.

In the present embodiment, unlike in the first embodiment, the wall surface body 10 and the tubular body 20 have respective substantially-trapezoid cross sections. The wall surface body 10 includes an upper wall 15, a lower wall 16 which faces the upper wall 15 and has a larger length than that of the upper wall 15, and two side walls 17 coupling these walls to each other. The upper wall 15 in the wall surface body 10 is provided with an uninclined surface 18 with no draft angle in its inner surface, and the lower wall 16 is provided with an opening portion 19 at the position facing the uninclined surface 18. Therefore, the tubular body 20 is exposed from the wall surface body 10 through the opening portion 19.

With the method for joining members according to the present embodiment, since the wall surface body 10 is provided with the opening portion 19, it is possible to reduce the weight of the wall surface body 10. Further, by utilizing the opening portion 19 as a die removing hole for use in molding, it is possible to provide the uninclined surface 18 with higher surface accuracy in the wall surface body 10. By utilizing the uninclined surface 18 with such higher surface accuracy, it is possible to cause the wall surface body 10 and the tubular body 20 to come in close contact with each other with higher accuracy to form a joint surface therebetween, which can suppress unstable rattling during joining them, thereby improving the joint strength.

Further, the side walls 17 may be also provided with uninclined surfaces in their inner surfaces, as well as the upper wall 15. Furthermore, although, in the present embodiment, the wall surface body 10 and the tubular body 20 have respective substantially-trapezoid cross sections, their cross-sectional shapes are not limited thereto and may be also arbitrary shapes.

Fourth Embodiment

Figure 7A:
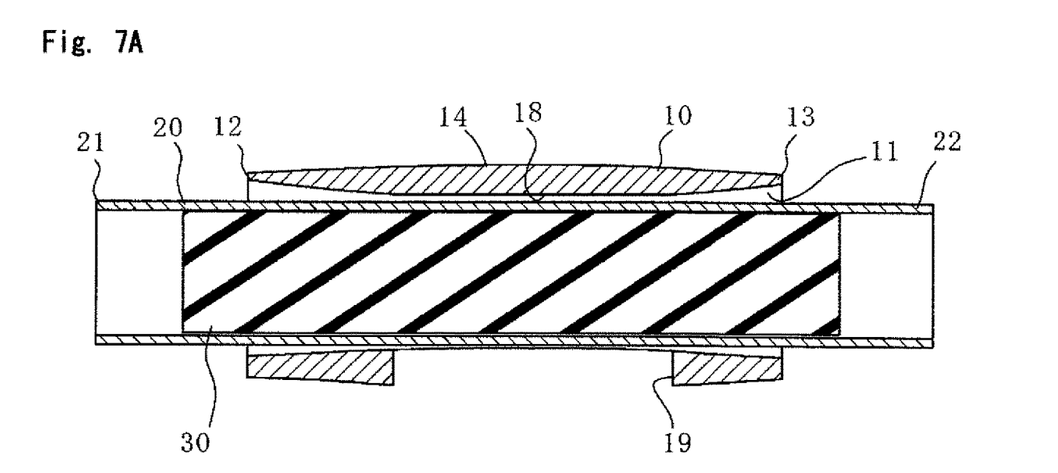
FIG. 7A is a lateral cross-sectional view taken along line A-A in FIG. 5B.
Figure 7B:
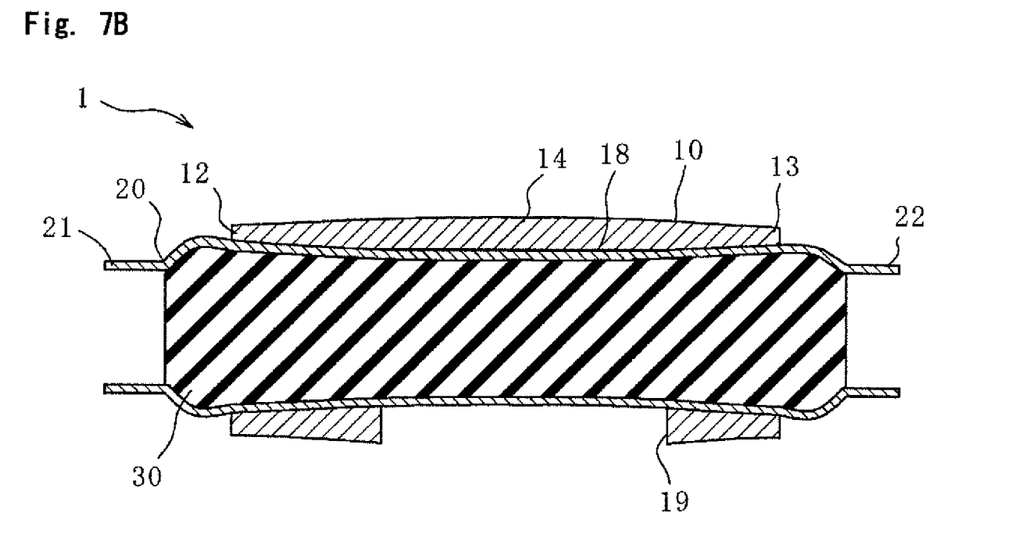
FIG. 7B is a lateral cross-sectional view taken along line B-B in FIG. 5B.

FIGS. 7A and 7B illustrate a method for joining members according to a fourth embodiment. In the present embodiment, the same constituent elements as those in the third embodiment will be designated by the same reference characters and will not be described redundantly.

In the present embodiment, in the wall surface body 10, the upper wall 15 (the upper bottom side of the trapezoid cross section) is provided in its inner surface with a draft angle larger than the draft angle in the inner surface of the lower wall 16 (the lower bottom side of the trapezoid cross section). For example, the draft angle in the inner surface of the upper wall 15 may be set to be 5 degrees, while the draft angle in the inner surface of the lower wall 16 may be set to be 3 degrees.

With the method for joining members according to the present embodiment, since the draft angle in the upper bottom side is larger than the draft angle in the lower bottom side, when the tubular body 20 deforms to expand, the tubular body 20 comes into contact with the wall surface body 10 at its lower bottom side at first and, thereafter, the tubular body 20 is pressed against the uninclined surface of the upper bottom side. That is, when the tubular body 20 is pressed against the uninclined surface 18 in the upper bottom side, the tubular body 20 is supported by the wall surface body 10 at its lower bottom side, and thus the tubular body 20 is deformed to expand into a state of being in close contact with the uninclined surface in the upper bottom side with substantially no gap therebetween. Since the uninclined surface 18 in the upper bottom side is formed with higher surface accuracy as described above, the wall surface body 10 and the tubular body 20 are allowed to come in close contact with each other with higher accuracy to form a joint surface therebetween, which can suppress unstable rattling during joining, thereby further improving the joint strength.

Fifth Embodiment

Figure 8A:
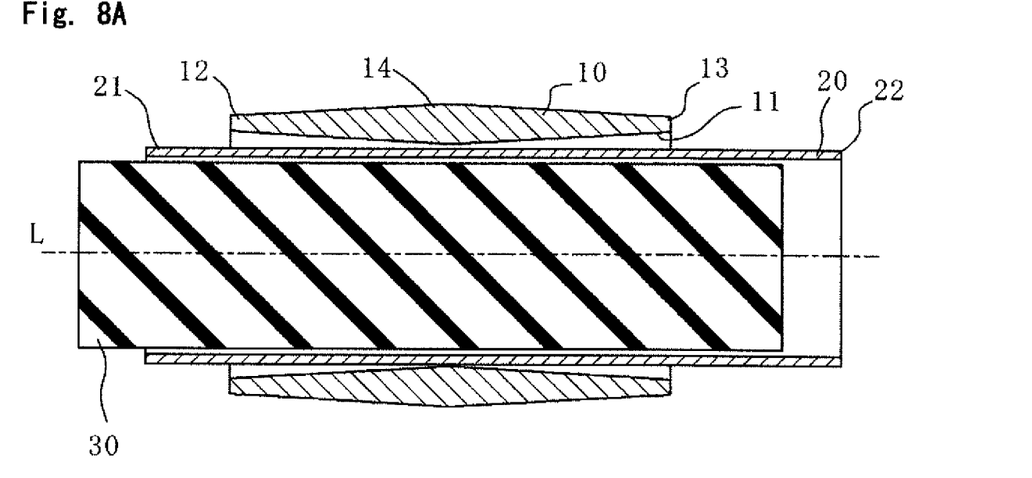
FIG. 8A is a cross-sectional view of a method for joining members according to a fifth embodiment, before joining.
Figure 8B:
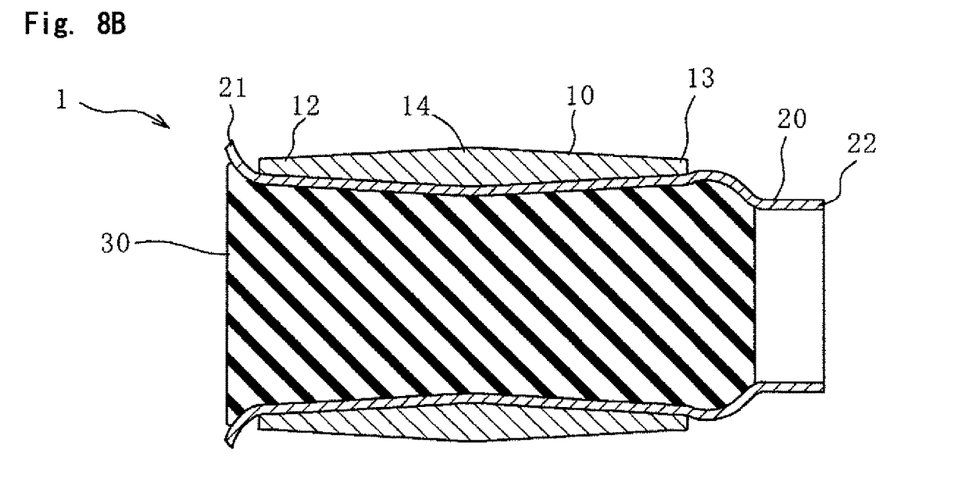
FIG. 8B is a cross-sectional view of the method for joining members according to the fifth embodiment, after joining.

FIGS. 8A and 8B illustrate a method for joining members according to a fifth embodiment. In the present embodiment, the same constituent elements as those in the first embodiment will be designated by the same reference characters and will not be described redundantly.

In the present embodiment, as illustrated in FIG. 8A, the elastic body 30 is compressed in the direction of the axial line L by a pressurizing apparatus which is not illustrated, in a state where the elastic body 30 is protruded from the tubular body 20 at one end portion 21 of the tubular body 20. Thus, as illustrated in FIG. 8B, the elastic body 30 is expanded outwardly in the radial direction of the axial line L to bend one end portion 21 of the tubular body 20 toward the wall surface body 10. That is, the one end portion 21 of the tubular body 20 is increased in size into a trumpet shape.

With the method for joining members according to the present embodiment, if a pull-out load is imposed on the tubular body 20, the tubular body 20 having such a trumpet shape is latched at its end portion to play a role in preventing the pull-out thereof, thereby improving the joint strength.

Sixth Embodiment

Figure 9A:
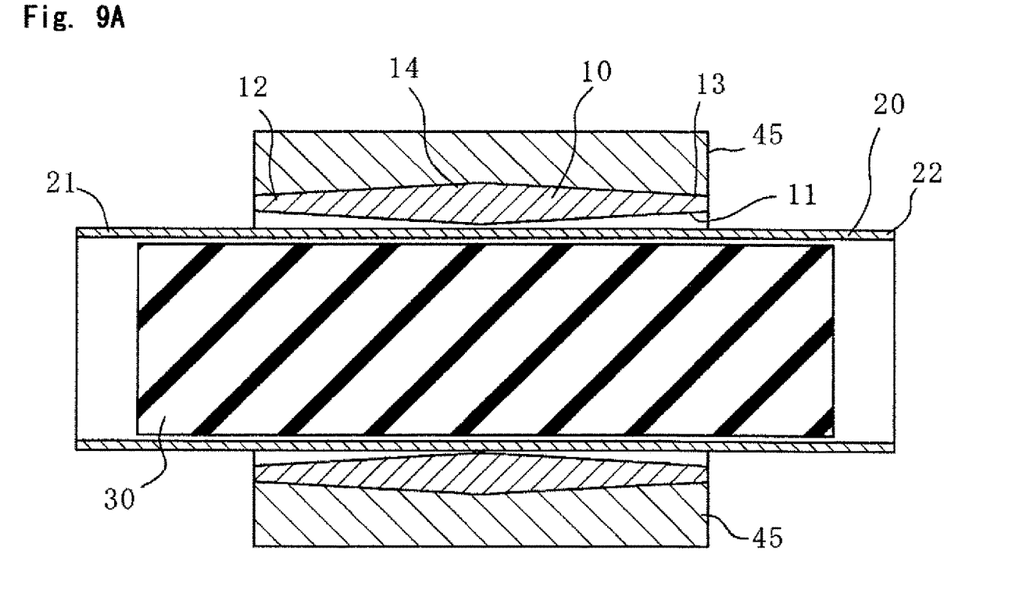
FIG. 9A is a cross-sectional view of a method for joining members according to a sixth embodiment, before joining.
Figure 9B:
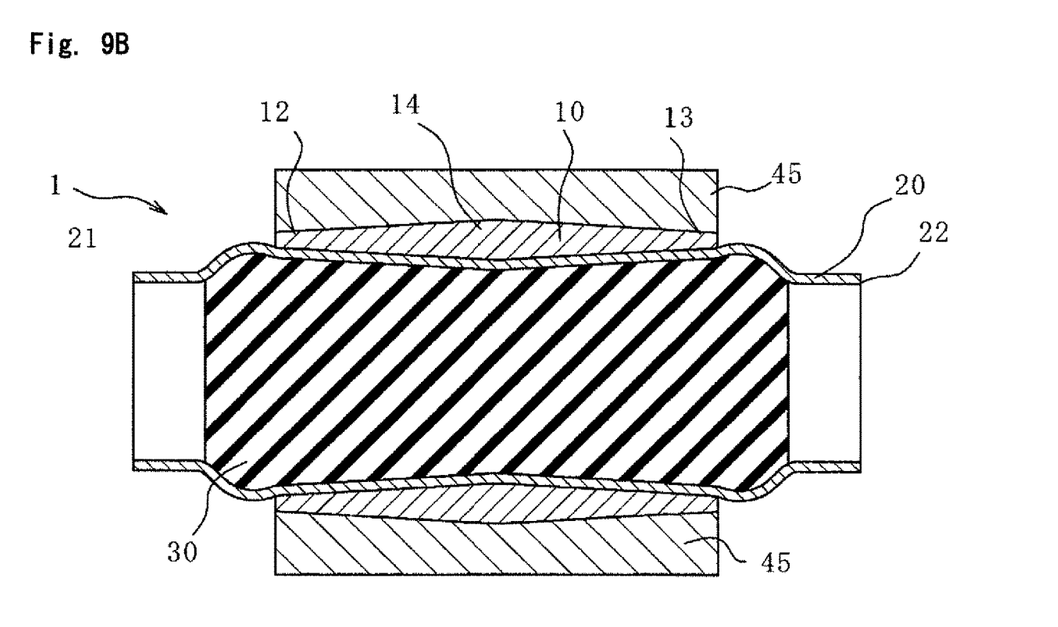
FIG. 9B is a cross-sectional view of the method for joining members according to the sixth embodiment, after joining.

FIGS. 9A and 9B illustrate a method for joining members according to a sixth embodiment. In the present embodiment, the same constituent elements as those in the first embodiment will be designated by the same reference characters and will not be described redundantly.

In the present embodiment, an outer frame die 45 for suppressing the deformation of the wall surface body 10 is further provided. The tubular body 20 is deformed to be expanded, in a state where the outer frame die 45 is placed on the outer side of the wall surface body 10.

With the method for joining members according to the present embodiment, the wall surface body 10 is suppressed from deforming due to the use of the outer frame die 45. This can prevent plastic deformation of the wall surface body 10.

Although there have been described the concrete embodiments of the present invention and modifications thereof, the present invention is not limited to the aforementioned embodiments and can be implemented by making various changes within the scope of the invention. For example, the contents of the respective embodiments may be properly combined with each other, as an embodiment of the invention.

The invention claimed is:

1. A method for joining members, comprising:
providing a first member which is a die-molded article provided with a hole portion with a draft angle provided from its opposite end portions toward its center portion, a second member with a hollow shape, and an elastic body;
inserting the second member into the hole portion in the first member;
inserting the elastic body into an inside of the second member; and
compressing the elastic body in a direction of an axial line of the second member to expand the elastic body outwardly in a radial direction of the axial line, thereby expanding and deforming the second member to join the second member to the first member by press-fitting;
wherein the first member is provided in its inner surface with an uninclined surface having no draft angle, and the first member is provided with an opening portion at a position facing the uninclined surface.

2. The method for joining members according to claim 1, further comprising:
providing a core;
providing a plurality of the elastic body;
inserting the core into the inside of the second member; and
inserting the elastic bodies into the second member in opposite sides with the core sandwiched between the elastic bodies.

3. The method for joining members according to claim 2, wherein the hole portion in the first member has a trapezoid cross section, the uninclined surface is provided in an upper bottom side of the hole portion, the opening portion is provided in a lower bottom side of the hole portion, and the upper bottom side of the hole portion is provided with a draft angle larger than a draft angle provided in the lower bottom side.

4. The method for joining members according to claim 2, wherein the second member has a diameter increased in a trumpet shape at its one end portion.

5. The method for joining members according to claim 2, further comprising:

providing an outer frame die;

placing the outer frame die on an outer side of the first member; and joining the first member and the second member to each other by press-fitting in a state where the first member is suppressed from deforming by the outer frame die.

6. The method for joining members according to claim 1, wherein the hole portion in the first member has a trapezoid cross section, the uninclined surface is provided in an upper bottom side of the hole portion, the opening portion is provided in a lower bottom side of the hole portion, and the upper bottom side of the hole portion is provided with a draft angle larger than a draft angle provided in the lower bottom side.

7. The method for joining members according to claim 1, wherein the second member has a diameter increased in a trumpet shape at its one end portion.

8. The method for joining members according to claim 1, further comprising:

providing an outer frame die;

placing the outer frame die on an outer side of the first member; and joining the first member and the second member to each other by press-fitting in a state where the first member is suppressed from deforming by the outer frame die.

9. A joint body comprising:

a first member which is a die-molded article provided with a hole portion with a draft angle provided from its opposite end portions toward its center portion; and a second member with a hollow shape which is inserted into the hole portion of the first member, wherein the second member is jointed to the first member by press-fitting in a state where the second member is expanded;

wherein the first member has, in its inner surface, an uninclined surface having no draft angle, and the first member has an opening portion at a position facing the uninclined surface.

* * * * *